United States Patent [19]
Ozaki et al.

[11] Patent Number: 6,027,794
[45] Date of Patent: Feb. 22, 2000

[54] PREPREGS, PROCESSES FOR THEIR PRODUCTION, AND COMPOSITE LAMINATES

[75] Inventors: Atsushi Ozaki; Hajime Kishi, both of Ehime-ken; Nobuyuki Odagiri, Matsuyama; Hiroki Oosedo; Hiroaki Hinomiya, both of Ehime-ken, all of Japan

[73] Assignee: Toray Industries, Inc., Japan

[21] Appl. No.: 08/999,931

[22] Filed: Aug. 8, 1997

Related U.S. Application Data

[63] Continuation of application No. 08/562,623, Nov. 24, 1995, abandoned, which is a continuation of application No. 08/302,763, Oct. 5, 1994, abandoned.

[30] Foreign Application Priority Data

Jan. 14, 1993 [JP] Japan .................................... 5-004715

[51] Int. Cl.$^7$ ..................................... B32B 27/04
[52] U.S. Cl. ..................... 428/297.7; 428/295.1; 428/295.4; 428/297.4; 428/298.1; 428/293.1; 428/300.4; 428/300.7; 442/166; 442/167; 442/168; 442/170; 442/171; 442/175; 442/381
[58] Field of Search ..................... 442/166, 167, 442/168, 170, 171, 175, 381; 428/295.1, 295.4, 297.4, 297.7, 298.1, 293.1, 300.4, 300.7

[56] References Cited

U.S. PATENT DOCUMENTS

| | | | |
|---|---|---|---|
| 4,302,499 | 11/1981 | Girisch | 428/236 |
| 4,550,051 | 10/1985 | Spielau et al. | 428/285 |
| 4,612,238 | 9/1986 | DellaVecchia et al. | 428/228 |
| 4,663,225 | 5/1987 | Farley et al. | 428/290 |
| 4,847,154 | 7/1989 | Ryang | 428/415 |
| 4,874,661 | 10/1989 | Browne et al. | 428/246 |
| 4,957,805 | 9/1990 | Biggs et al. | 428/223 |
| 4,992,325 | 2/1991 | Kim et al. | 428/241 |
| 5,028,478 | 7/1991 | Odagiri et al. | 428/283 |
| 5,279,893 | 1/1994 | Hattori et al. | 428/298 |

OTHER PUBLICATIONS

Improved Toughness of Carbon Fiber Composites Via the Use of Thermoplastic Interplies, Carroll, Bill, 33rd International SAMPE Symposium, Mar. 7–10, 1988, pp. 78–91.

*Primary Examiner*—Marion McCamish
*Assistant Examiner*—Arti R. Singh
*Attorney, Agent, or Firm*—Austin R. Miller

[57] ABSTRACT

Prepregs, comprising the following components [A], [B] and [C], with the component [C] distributed near either or both of the surface layers without being regularly arranged.

[A]: Long reinforcing fibers
[B]: A matrix resin
[C]: Long thermoplastic resin fibers The prepregs of the present invention are tacky and drapable, and the composite materials obtained by heating and forming the prepregs are high in heat resistance, and very high in impact resistance and inter-layer toughness. Furthermore, the prepregs are easy to produce and high in their latitude in availability of materials.

11 Claims, No Drawings

PREPREGS, PROCESSES FOR THEIR PRODUCTION, AND COMPOSITE LAMINATES

This application is a continuation of application Ser. No. 08/562,623, filed Nov. 24, 1995, abandoned, which is a continuation of application Ser. No. 08/302,763, filed Oct. 5, 1994, abandoned.

TECHNICAL FIELD

The present invention relates to prepregs used for preparing fiber reinforced plastics excellent in strength, elastic modulus, impact resistance and inter-layer toughness.

BACKGROUND TECHNIQUES

Fiber reinforced plastics as a kind of composite material are anisotropic materials with reinforcing fibers and a matrix resin as the essential components and their physical properties in the fiber direction are greatly different from those in the other directions.

In general, the strength and elastic modulus in the fiber direction are very high but those in the other directions are low. As a widely adopted method for producing a fiber reinforced plastic material, layers of a filmy precursor called a prepreg formed by impregnating reinforcing fibers with an uncured thermosetting resin are laminated, formed and cured to obtain the intended product.

Hereinafter unless otherwise stated, the term "composite material" means a fiber reinforced plastic material obtained by laminating layers of a prepreg, and forming and hardening the laminate.

When a composite material is obtained from a prepreg, a fabric obtained by weaving reinforcing fibers is used in the prepreg, or layers of a prepreg made of reinforcing fibers arranged unidirectionally are laminated with the reinforcing fiber directions crossed, for rendering the physical properties almost isotropic in the obtained product.

However, it is known that even if these techniques are adopted, the impact resistance and other properties of the composite material are not fundamentally improved by enhancement of the strength of the reinforcing fibers, since they are affected by inter-layer fracture. The inter-layer region of the composite material is that region in the vicinity of the interface between laminated layers of a prepreg. This region has a low content of reinforcing fibers, and since the reinforcing fibers are differently oriented on both sides of the interface, fracture is liable to occur in the region. Especially a composite material with a thermosetting resin as the matrix resin is insufficient in impact resistance since the matrix resin is low in toughness. Furthermore, if a tensile load is applied onto a crossed laminate, inter-layer peeling often occurs at an end of the laminate, so the latitude in laminate composition is often limited. Various methods are proposed for the purpose of improving the physical properties in the directions other than the fiber direction, especially impact resistance and inter-layer toughness, and many techniques are proposed which use, at the inter-layer region, a material different from the matrix resin, for absorbing fracture energy.

U.S. Pat. No. 4,604,319 discloses location of a thermoplastic resin between fiber reinforced prepreg layers to achieve higher impact resistance. However, in this case, the tackiness and drapability as advantages of a thermosetting resin are lost disadvantageously.

In U.S. Pat. No. 5,028,478, the inventors disclosed a matrix resin containing fine particles made of a resin. In particular, it was disclosed that the localized existence of fine resin particles in the surfaces of layers of a prepreg improved the impact resistance of the composite material while maintaining the tackiness and drapability of the prepreg. However, this technique also has a problem that it is not easy to obtain fine resin particles.

Furthermore, fine particles are liable to go into the reinforcing fibers, and the ingress of fine particles into the fibers lowers the physical properties of the composite material. Any attempt to avoid this complicates the prepreg production process. Japanese Patent Laid-Open No. 90-32843 discloses a technique for improving the inter-layer toughness of the composite material by sticking woven fabrics on the surfaces of fiber reinforced prepregs. In general, it is generally easier to impregnate a resin into fibers than into particles, and this technique is more advantageous in this regard, but the advantage is erased by the necessity to weave the fibers. Furthermore, there is a limit in the production of a woven fabric, to the minimum areal weight achievable, and it is not possible to obtain an inter-layer material with a suitable areal weight.

A paper in "Composite Materials: Testing and Design (Seventh Conference), ASTM STP 893" at Page 256 states that the inter-layer toughness can be improved by placing a Kevlar or polyester mat between layers. However, the preparation of the mat requires the steps of cutting and mat formation subsequently to the preparation of fibers, and cannot efficiently utilize the advantage of using fibers. Furthermore, there is a limit in lowering the areal weight.

Japanese Patent laid-Open Nos. 90-32843, 92-292635, 92-292636, 92-292909, 92-325527, 92-325528, 92-32529 and 93-17603 disclose that the inter-layer toughness of the composite material can be improved by arranging thermoplastic resin fibers in a certain direction on the surfaces of fiber reinforced prepreg layers. However, the attempt to lower the areal weight of the thermoplastic resin fibers accompanies a disadvantage that the areal weight, i.e., performance becomes non-uniform in the width direction of the prepreg. Moreover when reinforcing fibers arranged in one direction are used, arranging the thermoplastic resin fibers in parallel to the reinforcing fibers allows the thermoplastic resin fibers go into the reinforcing fibers, and so impair the physical properties of the composite material.

These techniques have still respective disadvantages that the effect of improving impact resistance is insufficient and that impact resistance is improved at the sacrifice of other properties such as inter-laminar shear strength and handling convenience.

Furthermore, compared to the conventional prepregs, these techniques have a common problem that the production process becomes complicated and difficult.

The object of the present invention is to present prepregs which can be used to produce composite materials excellent in strength, elastic modulus, impact resistance and inter-layer toughness and can be simply and easily produced, and also to present processes for producing the prepregs.

DISCLOSURE OF THE INVENTION

The present invention has the following constitution to achieve the above object.

Prepregs, comprising the following components [A], [B] and [C], with the component [C] distributed near the surface layer(s) on one side or both sides without being regularly arranged.

[A]: Long reinforcing fibers
[B]: A matrix resin
[C]: Long fibers of a thermoplastic resin Moreover, the present invention has the following constitution to achieve the above object.

A process for preparing a prepreg, comprising the steps of impregnating the following component [A] with the following component [B], and arranging the following component [C] on one side or both sides at random in a planar state.
[A]: Long reinforcing fibers
[B]: A matrix resin
[C]: Long fibers of a thermoplastic resin Furthermore, the present invention has the following constitution to achieve the above object.

A composite material, comprising the following components [A], [D] and [C], with the component [C] arranged at random in a planar state between layers.
[A]: Long reinforcing fibers
[D]: A cured matrix resin
[C]: Long fibers of a thermoplastic resin

THE MOST PREFERRED EMBODIMENT OF THE INVENTION

The present invention is specifically described below.

The component [A] of the present invention is long reinforcing fibers, and can be selected from various fibers, to be suitable for each application of the composite material prepared, for example, from carbon fibers, graphite fibers, aramid fibers, silicon carbide fibers, alumina fibers, boron fibers, tungsten carbide fibers, glass fibers, etc. It is also possible to use multiple kinds of these reinforcing fibers in combination.

Among these fibers, carbon fibers and graphite fibers are good in the present invention since they are good in specific strength and specific elastic modulus and greatly contribute to the reduction in weight. Any kind of carbon fiber and graphite fiber can be used for respective applications. High strength carbon fibers of 1.5% or more in tensile elongation are suitable for obtaining a composite material high in strength. High strength high elongation carbon fibers of 450 kgf/mm$^2$ or more in tensile strength and 1.7% or more in tensile elongation are more preferable, and high strength high elongation carbon fibers of 1.9% or more in tensile elongation are most suitable. The reinforcing fibers used in the present invention must be long, and should be preferably 5 cm or more in length. If the fibers are shorter than 5 cm, the strength of the reinforcing fibers cannot be sufficiently exhibited in the composite material. The carbon fibers and graphite fibers can be used also as a mixture with other reinforcing fibers.

The reinforcing fibers are not limited in form or arrangement, and those arranged in one direction, in random directions, formed as a sheet, mat or woven fabric, or braided can be used. Especially for an application requiring a high specific strength and a high specific elastic modulus, reinforcing fibers paralleled in one direction are most suitable, but those arranged as a woven fabric easy to handle are also suitable for the present invention.

The matrix resin used as the component [B] in the present invention is mainly composed of a resin which is cured by external energy such as heat, light or electron beam, to form an at least partially three-dimensionally cross-linked material. In particular, a thermosetting resin to be cured by heat is preferably used.

The thermosetting resin especially suitable for the present invention is an epoxy resin, and it is generally used in combination with a curing agent and curing catalyst. In particular, an epoxy resin which is made from an amine, phenol or compound with a carbon-carbon double bond is preferable. The epoxy resin with an amine as a precursor can be selected from, but not limited to, various isomers of tetraglycidyl diaminodiphenylmethane, triglycidyl-p-aminophenol, triglycidyl-m-aminophenol and triglycidyl aminocresol. The epoxy resin with a phenol as the precursor can be selected from, but not limited to, bisphenol A type epoxy resin, bisphenol F type epoxy resin, bisphenol S type epoxy resin, phenol novolak type epoxy resin and cresol novolak type epoxy resin. The epoxy resin with a compound with a carbon-carbon double bond as a precursor can be selected from, but not limited to, alicyclic epoxy resins. Resins obtained by brominating these epoxy resin can also be used. An epoxy resin with an aromatic amine such as tetraglycidyl diaminodiphenylmethane is good in heat resistance and good in adhesiveness to the reinforcing fibers, so most suitable for the present invention.

An epoxy resin can be preferably used in combination with an epoxy curing agent. The epoxy curing agent used can be any compound with an active group capable of reacting with an epoxy group.

Preferably a compound with an amino group, acid anhydride group or azido group is suitable. It can be selected, for example, from dicyandiamide, various isomers of diaminodiphenylsulfone, various derivatives of diaminodiphenylmethane, and aminobenzoates.

Specifically, dicyandiamide is preferably used since it is excellent in its ability to allow strage of the prepreg for a long time. Various isomers of diaminodiphenylsulfone are most suitable in the present invention since they make the cured material good in heat resistance, and the alkyl derivatives of diaminodiphenylmethane, especially 3,3',5,5'-tetraalkyl derivatives are suitable in the present invention since they make the cured material high in elongation and low in water absorbability.

The aminobenzoates preferably used include trimethylene glycol di-p-aminobenzoate and neopentyl glycol di-p-aminobenzoate, and since they are more excellent in tensile elongation even though lower in heat resistance than diaminodiphenylsulfone, they are selectively used for particular applications.

The thermosetting resin used as the component [B] can be preferably selected from maleimide resins, resins with acetylene terminals, resins with nadic acid terminals, resins with cyanate terminals, resins with vinyl terminals and resins with allyl terminals. Any of these resins can also be mixed with an epoxy resin or another resin. A reactive diluent can be used, and a modifying agent such as a thermoplastic resin or elastomer can also be mixed to such an extent that the heat resistance is not greatly lowered.

A maleimide resin is a compound with an average of two or more maleimide groups per molecule. A bismaleimide prepared from diaminodiphenylmethane is especially preferably used. The maleimide compound can be selected, for example, from, but not limited to, N,N'-phenylene bismaleimide, N,N'-hexamethylene bismaleimide, N,N'-methylene-di-p-phenylene bismaleimide, N,N'-oxydi-p-phenylene bismaleimide, N,N'-4,4'-benzophenone bismaleimide, N,N'-diphenylsulfone bismaleimide, N,N'-(3,3'-dimethyl)-methylenedi-p-phenylene bismaleimide, N,N'-4,4'-dicyclohexylmethane bismaleimide, N,N'-m(or p)-xylylenebismaleimide, N,N'-(3,3'-diethyl)methylenedi-p-phenylenebismaleimide, N,N'-m-tolylenedimaleimide and bismaleimide of bis(aminophenoxy)benzene, and also the reaction product of maleic anhydride and a polyamine produced by reaction between aniline and formalin. Furthermore, two or more of these maleimide compounds can also be used as a mixture, and the maleimide compound used can also contain a monomaleimide compound such as N-allylmaleimide, N-propylmaleimide, N-hexylmaleimide or N-phenylmaleimide, etc.

The maleimide resin is preferably used in combination with a curing agent. The curing agent can be any compound with an active group capable of reacting with a maleimide group. Preferably a compound with amino group or an alkenyl group such as allyl group, benzocyclobutene group, allylnadicimide group, isocyanate group, cyanate group or epoxy group is suitable. A typical curing agent with an amino group is diaminodiphenylmethane. Typical curing agents with an alkenyl group are 0,0'-diallylbisphenol A and bis(propenylphenoxy)sulfone.

A bismaleimidetriazine resin (BT resin) composed of any of the above bismaleimides and a cyanate is also suitable as a thermosetting resin used as the component [B] of the present invention. A preferable resin with cyanate terminals is a cyanate compound of a polyhydric phenol such as bisphenol A. A mixed resin consisting of a cyanate resin and a bismaleimide resin is marketed as BT resin produced by Mitsubishi Gas Chemical Co., Inc. and is suitable for the present invention. These are generally better in heat resistance and water resistance than epoxy resins but are lower in toughness and impact resistance, and so are selectively used for particular applications. The ratio by weight of bismaleimide and cyanate is in a range from 0:100 to 70:30. A resin of 0:100 corresponds to a triazine resin, and this is also suitable for the present invention.

Furthermore, a thermosetting polyimide resin with reactive groups at the terminals is also suitable as the component [B] of the present invention. The reactive groups at the terminals are preferably nadiimide groups, acetylene groups or benzocyclobutene groups, etc.

The component [B] of the present invention can also be selected from thermosetting resins widely accepted in the industry such as phenol resin, resorcinol resin, unsaturated polyester resin, diallyl phthalate resin, urea resin and melamine resin.

The component [B] of the present invention can be modified with a thermoplastic resin such as polysulfone or polyether imide or inorganic fine particles such as fine silica particles or elastomer, etc.. In this case; the content of the ingredient other than the thermosetting resin should be preferably within 35 wt %. Layers of a prepreg of the present invention are laminated and cured using such a means as heat or light, to obtain a composite material. In this composite material, the resin component produced by curing the component [B] is called the component [D]. The component [B] preferably used for the prepreg of the present invention is a resin composition which can be separated into phases while it is heated from 10° C. to 250° C. In this case, the component [D] of the composite material has a structure separated into phases. Whether or not a resin composition can be separated into phases can be easily judged by observing the composition being heated, using a microscope.

It is preferable that the component [D] structurally separated into phases is structurally separated into a micro-phase mainly composed of a thermosetting resin and a micro-phase mainly composed of a thermoplastic resin.

It is more preferable that the preferred resin composition is a cured resin material structurally separated into a micro-phase mainly composed of a thermosetting resin and a micro-phase mainly composed of a thermoplastic resin. The component [D] is obtained by curing the component [B]. It is further more preferable that while the component [B] is cured, the structure separated into micro-phases formed has the following feature. In the structure, the phase mainly composed of a thermoplastic resin exists separately from the phase mainly composed of a thermosetting resin, and at least the phase mainly composed of a thermoplastic resin has a three-dimensionally continuous network. This structure is obtained if a homogeneous compatible solution consisting of a thermosetting resin not yet cured and a thermosetting resin is once formed and separated into phases while being cured. It is still more preferable that the component [D] is a cured resin material structurally separated into two micro-phases each of a three-dimensionally continuous network. In some cases, it is also preferable that another dispersed phase is contained in the continuous phase. In particular, the presence of a dispersed rubber phase preferably greatly contributes to the enhancement of toughness.

It is more preferable that the continuous phase mainly composed of a thermoplastic resin is structurally provided at intervals of 0.01 to 20 microns. If the intervals are less than 0.01 micron, the fracture surface is shallow in the depth of roughness, and since the fracture paths are short, it is difficult to exhibit high toughness. If the intervals are more than 20 microns, the fracture paths are simplified, to lessen the effect of enhancing toughness. More preferable intervals are 0.1 to 10 microns.

The phase separated structure of the cured resin can be observed by a microscope in a conventional manner. It can be observed by an optical microscope, but it is preferable to dye the material with osmium tetroxide, etc., for observation by an electron microscope. Its presence can be found if it is clear that different phases exist, that at least one of the phases forms a continuous structure, and that a dispersed phase exists in the continuous phase. If an analyzer such as an X-ray microanalyzer is used with a microscope, the components can be identified.

The fracture strain energy release rate GIC of the cured resin of the present invention can be calculated from $G_{IC} = K_{IC}^2 (1-g^2)/E$, wherein $K_{IC}$ is the stress intensify factor obtained according to ASTM E 399-83, g is Poissson's ratio and E is the flexural elastic modulus measured according to ASTM D 790.

The thermoplastic resin in the components [B] and [D] is thermoplastic resin widely accepted in the industry, but which does not impair the high heat resistance and high elastic modulus peculiar to the thermosetting resin, a thermoplastic resin belonging to aromatic engineering plastics is preferable. That is, it can be typically selected from highly heat resistant thermoplastic resins with an aromatic polyimide skeleton, aromatic polyamide skeleton, aromatic polyether skeleton, aromatic polysulfone skeleton or aromatic polyketone skeleton soluble in thermosetting resins. Especially those with an aromatic polyimide skeleton are preferable since they are excellent in heat resistance, solvent resistance and toughness, and include, for example, polyether sulfones, polysulfones, polyimides, polyether imides or polyimides with phenyltrimethylindane structure, etc. An aromatic polyimide suitable as the thermoplastic resin can be synthesized by any process publicly known in the industry.

Typically, a tetracarboxylic dianhydride and a diamino compound can be caused to react with each other for synthesizing the intended product. The tetracarboxylic dianhydride is preferably selected from aromatic tetracarboxylic dianhydrides such as pyromellitic dianhydride, 3,3',4.,4'-benzophenonetetracarboxylic dianhydride, 3,3',4,4'-biphenyltetracarboxylic dianhydride, 3,3',4,4'-diphenylethertetracarboxylic dianhydride, 3,3',4,4'-diphenylsulfonetetracarboxylic dianhydride, more preferably aromatic tetracarboxylic dianhydrides such as 3,3',4,4'-diphenylethertetracarboxylic dianhydride and 3,3', 4,4'-diphenysulfonetetracarboxylic dianhydride.

The diamino compound is preferably selected from aromatic diamino compounds such as diaminodiphenylmethane, metaphenylenediamine, paraphenylenediamine, diaminodiphenyl ether, diaminodiphenylsulfone, diaminodiphenyl sulfide, diaminodiphenylethane, diaminodiphenylpropane, diaminodiphenyl ketone, diaminodiphenylhexafluoropropane, bis(aminophenoxy)benzene, bis(aminophenoxy)diphenylsulfone, bis(aminophenoxy)diphenylpropane, bis(aminophenoxy)diphenylhexafluoropropane, diaminodiphenylfluorene, fluororenediamine, dimethyl substitution derivative of diaminodiphenylmethane, tetramethyl substitution derivative of diaminodiphenylmethane, diethyl substitution derivative of diaminodiphenylmethane, tetraethyl substitution derivative of diaminodiphenylmethane and dimethyldiethyl substitution derivative of diaminodiphenylmethane, more preferably aromatic diamino compounds such as bis(aminophenoxy)benzene, bis(aminophenoxy)diphenylsulfone, bis(aminophenoxy)diphenylpropane, bis(aminophenoxy)diphenylhexafluoropropane, diaminodiphenylfluorene, dimethyl substitution derivative of diaminodiphenylmethane, tetramethyl substitution derivative of diaminodiphenylmethane, diethyl substitution derivative of diaminodiphenylmethane, tetraethyl substitution derivative of diaminodiphenylmethane and dimethyldiethyl substitution derivative of diaminodiphenylmethane.

To let a thermoplastic resin molecule with a polyimide skeleton, polyamide skeleton, polyether skeleton, polysulfone skeleton or polyketone skeleton have a hexafluoropropane skeleton is preferable since its solubility into a thermosetting resin not yet cured is enhanced, for forming a proper phase separated structure after curing. This structure remarkably lowers the water absorbability of the cured resin, as an effect to improve the environment resistance of the cured resin.

It is especially preferable in view of compatibility control that the thermoplastic resin in the components [B] and [D] is a block copolymer or graft copolymer consisting of a chain compatible with the thermosetting resin and a chain incompatible with the thermosetting resin.

One of preferable examples is a block copolymer or graft copolymer with a chain composed of a siloxane skeleton incompatible with the thermosetting resin in the components [B] and [D], high in toughness and low in water absorption. Especially preferable is a block copolymer or graft copolymer with a polyimide skeleton, polyamide skeleton, polyether skeleton, polysulfone skeleton or polyketone skeleton compatible with the thermosetting resin in the component [B] as a portion other than the chain composed of the siloxane skeleton. As the siloxane skeleton, dimethyl siloxane is especially preferable, but phenyl siloxane and its copolymers are also preferable.

The increase in resin viscosity caused by addition of a thermoplastic resin having a block-copolymerized siloxane skeleton is low compared with that caused by addition of an aromatic thermoplastic resin having the same molecular weight. Therefore, this has the effects that working facility is less impaired, and that a prepreg with the resin as the matrix resin is excellent in tackiness and drapability. From another viewpoint, the amount of the thermoplastic resin added into the component [B] is less limited, and a large amount can be introduced into the resin composition without impairing the tackiness advantageously for achieving a higher resin toughness.

The most preferable block copolymer or graft copolymer as the thermoplastic resin in the components [B] and [D] has a polyimide chain portion.

It is preferable in view of solvent resistance and fatigue resistance that the thermoplastic resin in the components [B] and [D] has functional groups capable of reacting with the thermosetting resin in the component [B] at the terminals, since they enhance the adhesiveness at the interface. Such a thermoplastic resin can be selected, for example, from those with such functional groups as amino groups, epoxy groups, hydroxyl groups or carboxyl groups at the terminals, especially preferably those with amino groups at the terminals.

It is preferable that the amount of the thermosetting resin in the components [B] and [D] is 5 to 40 wt % based on the weight of all the ingredients in the components [B] and [D]. If the amount is below the range, the effect of enhancing toughness is small, and if above the range, the working facility is remarkably impaired. A more preferable range is 8 to 30 wt %.

The thermoplastic resin in the component [B] may be dissolved or simply dispersed, or even partially dissolved or dispersed in the uncured thermosetting resin beforehand. The percentage of dissolution or dispersion can be controlled to adjust the viscosity of the resin, for adjusting the tackiness and drapability as a prepreg at desired levels. The dispersed thermoplastic resin is mostly dissolved in the thermosetting resin during forming, and separated again as a phase before completion of curing, for. contributing to the formation of said proper micro-phase separated structure.

The molecular weight of the thermoplastic resin in the components [B] and [D] are preferably in a number average molecular weight range from 2000 to 20000 if the thermoplastic resin is to be dissolved in the uncured thermosetting resin beforehand. If the molecular weight is below the range, the effect of enhancing the toughness is small, and if above the range, the viscosity of the resin is remarkably increased to impair significantly the working facility. A more preferable range is from about 2500 to 10000. The component [C] is made from long fibers of a thermoplastic resin and is distributed at random near the surface layer of the prepreg. The "long fibers" are fibers of 3 cm or more in length. The "random distribution" is such that the fibers are not arranged to repeat the same pattern at constant intervals (e.g., parallel arrangement of monofilaments or multi-filaments, and regular fabric structures such as woven fabric, knitted fabric, braid, etc.). The random distribution can be realized by simple scattering or spraying, and does not require any special machine such as a weaving machine as used for preparing regular fabrics. The random distribution can also be realized by using a long-fiber nonwoven fabric. A long-fiber nonwoven fabric is excellent in productivity compared to a woven fabric or mat, since it can be obtained directly from a raw resin without making it into filaments once. Furthermore, this production method keeps the prepreg of the present invention free from the problem, as occurs with parallel arranged fibers, that the component [C] invades the component [A]. The component [C] in the prepreg of the present invention is characterized by being irregular in arrangement. To obtain desirable physical properties, it is desirable to keep the areal weight of the component [C] as uniform as possible.

The component [C] is distributed near the surface layer of the prepreg, but does not cover the entire surface, so it can be easily impregnated with the matrix resin, to exhibit the tackiness and drapability of the matrix resin as the properties of the prepreg, and so render the prepreg excellent in handling convenience.

Furthermore, the component [C] acts to keep a certain quantity of resin on the surface of the prepreg, to improve the tackiness compared to ordinary prepregs, and to keep the temporal change of tackiness very small.

The component [C] is made of a thermoplastic resin. A typical thermoplastic resin for the component [C] has bonds selected from carbon-carbon bonds, amide bonds, imide bonds, ester bonds, ether bonds, carbonate bonds, urethane bonds, thioether bonds, sulfone bonds, imidazole bonds and carbonyl bonds at the main chain. In particular, polyamides, polycarbonates, polyacetals, polyphenylene oxide, polyphenylene sulfide, polyarylates, polyesters, polyamidoimides, polyimides, polyether imides, polysulfones, polyether sulfones, polyether ether ketones, polyaramid and polybenzimidazole are excellent in impact resistance and suitable as materials for nonwoven fabrics used in the present invention. Among them, polyamides, polyimides, polyamidoimides, polyether imides, polyether sulfones and polysulfones are high in toughness and good in heat resistance, and are very suitable for the present invention. The toughness of polyamides is especially excellent, and amorphous transparent nylons can also provide heat resistance. The component [C] can also be formed by using long fibers of a plurality of thermoplastic resins in combination, or using long fibers obtained by spinning a plurality of thermoplastic resins together. These methods are preferable since the properties of the composite material can be improved by using an optimum combination of thermoplastic resins.

The component [C] must be distributed near the surface layer of the prepreg. In this case, when the prepreg has been processed into a composite material, an inter-layer region with a certain thickness is formed, to localize the component [C] between layers, thereby presenting a composite material excellent in impact resistance. The distribution near the surface layer means that more than 90% of the component [C] exists in a region from the surface of the prepreg to 30% of the thickness of the prepreg. When, as is preferred, more than 90% of the component [C] exists in a region from the surface of the prepreg to 20% of the thickness of the prepreg, the effect of the present invention can be exhibited more remarkably.

If a large amount of the component [C] exists deep inside, remote from a surface layer which is not in conformity with the above condition, the inter-layer energy absorption is insufficient, so that the effect of improving the composite material in its impact resistance and inter-layer toughness is reduced, and furthermore, since the arrangement of the reinforcing fibers is disturbed to lower the percentage of the matrix resin near the reinforcing fibers, the composite material may be degraded in strength and heat resistance.

If, as is preferred, the component [C] is similarly locally distributed on both sides of the prepreg, layers of the prepreg can be freely laminated without paying attention to which side is obverse or reverse when the composite material is produced. However, if two layers of a prepreg with the component similarly distributed only on one side are laminated together with the component [C] kept between the two layers of the prepreg, the same effect can be achieved. Accordingly, the prepreg with the component [C] distributed only on one side is also within the present invention.

The distribution of the component [C] in the prepreg can be evaluated as follows.

At first a prepreg is held in close contact between two smooth support plates, and gradually heated over a long period of time, to be cured. It is essential in this case that gelation should be achieved at a temperature as low as possible. If the temperature is raised suddenly before gelation is achieved, the resin in the prepreg flows, and the correct distribution in the prepreg cannot be evaluated. After completion of gelation, the prepreg is gradually heated, taking further time, to be cured. The cured prepreg is cut, and the cross section is photographed at a magnification of 200 times or more onto a size of 200 mm×200 mm or more. If it is difficult to discriminate between the components [B] and [C], one of them should be selectively dyed for observation. Either an optical microscope or an electron microscope, whichever is suitable, can be used.

The microphotograph is used to obtain the average thickness of the prepreg at first. The average thickness of the prepreg is obtained by taking measurements at five optional points on the photograph, and averaging the values. Subsequently, lines are drawn in parallel to the face direction of the prepreg at depths of 30% prepreg thicknesses from the surfaces in contact with both the support plates. The areas of the component [C] existing between the surface in contact with the support plate and the 30% parallel line on both sides are determined, and the total area of the component [C] existing in the overall thickness of the prepreg is determined. The ratio between the determined values is calculated as the rate of the component [C] existing within 30% depths from the surfaces of the prepreg. The area determination can also be effected by weight method or image processing using an image analyzer. To eliminate the effect of partial dispersion in the distribution, this evaluation should be effected over the entire width of the photo obtained, at five or more optional points on the photo, for averaging the values.

To obtain a composite material higher in impact resistance, it is preferable that the elastic modulus and yield strength of the material of the component [C] be lower than those of the cured resin of the component [B]. However, on the other hand, if the elastic modulus of the material of the component [C] be low like an elastomer, the component [C] is liable to be deformed during molding due to variations in conditions such as pressure, temperature and heating rate, so that the thickness of the inter-layer region of the laminate fluctuates, and as a result, the composite material becomes unstable in its physical properties. Accordingly, to achieve a stable high toughness unsusceptible to the variations of molding conditions, it is preferable that the flexural elastic modulus of the material as bulk of the component [C] is in a range from 80 to 400 kg/mm$^2$. It is also preferable for the same reason as above that the tensile elastic modulus of the component [C] as fibers is in a range from 40 to 5000 kg/mm$^2$. A suitable amount of the component [C] is 2 to 30 wt % based on the total weight of the components [B] and [C] in the prepreg or composite material. If the amount is less than 2 wt %, the intended effect can be little exhibited, and if more than 30 wt %, the prepreg is greatly degraded in tackiness and drapability. When the component [C] is used for enhancing the inter-layer toughness of the composite material due to its high rupture elongation and high toughness, while the rigidity of the component [B] is used for providing the compressive strength of the composite material, it is recommended that the amount of the component [C] be present in a rather smaller amount in a range from 2 to 20 wt %, more preferably 4 to 13 wt %.

The prepreg described as above can be prepared by the following methods.

[Method 1]

The component [C] is arranged at random on the surfaces of [A] impregnated with the component [B], to form a prepreg. In this state, the component [C] remains exposed on the surfaces of the prepreg to present insufficient tackiness. Accordingly, it is desirable to heat and press the surfaces using a heat roller, etc. after completion of scattering, for impregnating the component [C] with the component [B].

As another version of this method, the component [C] can be arranged at random in a planar state on the surfaces of the component [A] impregnated with the component [B], and release paper, etc. coated with the component [B] can be bonded to the surfaces and heated and pressed for impregnation. In this case, it is preferable that the component [B] impregnated in the component [A] is different in composition from the component [B] applied onto the release paper, etc. Especially if the component [B] applied on the release paper, etc. is tackier than the component [B] impregnated in the component [A], the prepreg obtained is preferably higher in tackiness.

[Method 2]

The component [C] is arranged at random in a planar state on the surface of the component [B] formed as a film on a base such as release paper, and the laminate is bonded to the component [A], and heated and pressed, to form a prepreg.

As another version of this method, a similar operation can also be effected using the component [A] partially impregnated with the component [B].

[Method 3]

The component [C] is arranged at random in a planar state on the component [A], and the laminate is impregnated with the component [B], to form a prepreg. This method is especially suitable when the component [A] can hold its form like a woven fabric.

In the above three methods, for arranging the component [C] at random in a planar state, at first, a thermoplastic resin is spun to obtain monofilaments or multi-filaments, and they are sprayed onto an object using compressed air, etc. directly or through an oscillating guide, or after once striking against an impact plate.

In this case, in principle, any spinnable resins can be used to form the component [C]. Furthermore, there is no limit to the reduction in the weight per unit area.

It is also possible to directly arrange the filaments discharged from a nozzle plate, at random in a planar state. In this case, the filaments discharged from an ordinary nozzle plate can be drawn using a compressed air current to be sprayed onto the object, or the filaments note drawn can be sprayed using a melt blow nozzle plate. These methods are suitable for easily spinnable resins.

In the above methods, the long fibers can also be once sprayed onto a collector such as wire gauze, and then transferred onto the surface of the object, instead of being directly sprayed onto the object. Furthermore, a long-fiber nonwoven fabric of the component [C] can be prepared beforehand by the spun bond method or melt blow method, and it can be used for preparing a prepreg according to either of the following methods.

[Method 4]

Nonwoven fabrics of the component [C] are bonded onto the component [A] impregnated with the component [B], to form a prepreg. In this case, since the component [C] is exposed on the surfaces of the prepreg in this state to present insufficient tackiness, it is desirable to heat and press the surfaces using a heat roller, etc. after completion of bonding, to effect impregnation of the component [C] with the component [B].

As another version of this method, the nonwoven fabrics of the component [C] can also be impregnated with the component [B] beforehand. Furthermore in this case, it is preferable that the component [B] impregnated in the component [A] is different in composition from the component [B] impregnated in the nonwoven fabrics of the component [C]. Especially if the component [B] impregnated in the nonwoven fabrics of the component [C] is tackier than the component [B] impregnated in the component [A], the prepreg obtained is preferably higher in tackiness.

[Method 5]

The component [B] formed as a film on a base such as release paper, a nonwoven fabric of the component [C] and the component [A] are overlapped in any sequence or simultaneously irrespective of the positional relation in overlapping, and heated and bonded to form a prepreg. In this case, in the positional relation in overlapping, holding the nonwoven fabric of the component [C] between the component [A] and the component [B] formed as a film is preferable since the nonwoven fabric of the component [C] is easily impregnated with the component [B].

In a particular preffered version, nonwoven fabrics of the component [C] are overlapped on both sides of the component [A] and then formed films of the component [B] are supplied for overlapping on both the nonwoven fabrics, to form a prepreg. In another particular preffered version, a nonwoven fabric of the component [C] is bonded onto the surface of the component [B] formed as a film, and then two sheets of the laminate are overlapped onto both the sides of the component [A] with the nonwoven fabrics of the component [C] kept in the side of the component [A], and heated and pressed by means such as a heat roll, to form a prepreg.

EXAMPLES

The present invention is described below in more detail with reference to examples.

Present Invention Example 1

The following raw materials were kneaded to prepare a matrix resin composition.

(1) Tetraglycidyl diaminodiphenylmethane (ELM434 produced by Sumitomo Chemical Co., Ltd.) 60 parts by weight (2) Bisphenol A type epoxy resin (Epikote 828 produced by Yuka Shell Epoxy K.K.) 20 parts by weight (3) Tri-functional aminophenol type epoxy resin (ELM100 produced by Sumitomo Chemical Co., Ltd.) 20 parts by weight (4) 4,4'-diaminodiphenylsulfone (Sumicure S produced by Sumitomo Chemical Co., Ltd.) 47.3 parts by weight (5) Polyether sulfone (PES5003P produced by Mitsui Toatsu Chemicals, Inc.) 16 parts by weight An intermediate product was prepared by impregnating the carbon fibers (T800H produced by Toray Industries, Inc.) with the matrix resin using the drum winding method. The amount of the carbon fibers per unit area was 190 g/m$^2$ and the amount of the matrix resin was 90.6 g/m$^2$.

The intermediate product was sprayed, on its one side, with nylon 66 fibers (five 15-denier filaments) using an aspirator with an impact plate attached at the tip and compressed air, to prepare a prepreg. The areal weight of the fibers was 13.0 g/m$^2$.

Twenty four layers of the prepreg were laminated in quasi-isotropic configuration (+45'/0'/−45'/90') and treated in an autoclave at 180° C. at a pressure of 6 kg/cm² for 2 hours. The cured board obtained was cut into 150 mm×100 mm test pieces. A drop impact of 1500 inch•Pound/inch was applied to the center of each test piece, and the compressive strength measured according to ASTM D 695 after impact was found to be 34.0 kg/mm².

Present Invention Example 2

An intermediate product was prepared by impregnating carbon fibers (T800H produced by Toray Industries, Inc.) with the same matrix resin as used in Present Invention Example 1 using the drum winding method. The areal weight of the carbon fibers was 190 g/m², and the areal weight of the matrix resin was 90.6 g/m².

The intermediate product was sprayed, on its one side, with a polyether imide (Ultem 1010 produced by GE Plastics) fiber (one 13-denier filament) using an aspirator with an impact plate attached at the tip and compressed air, to obtain a prepreg. The areal weight of the fiber was 13.0 g/m².

From the prepreg, a cured board was prepared as in Present Invention Example 1, and with a drop impact applied, the compressive strength was measured and found to be 35.8 kg/mm².

Present Invention Example 3

An intermediate product was prepared by impregnating carbon fibers (T800H produced by Toray Industries, Inc.) with the same matrix resin as used in Present Invention Example 1 using the drum winding method. The areal weight of the carbon fibers was 190 g/m² and the areal weight of the matrix resin was 90.6 g/m².

The intermediate product was sprayed, on its one side, with a nylon 12 fiber discharged from a nozzle plate with one orifice using an aspirator with an impact plate at the tip and compressed air while the fiber was drawn, to obtain a prepreg. The areal weight of the fiber was 13.0 g/m².

From the prepreg, a cured board was prepared, and with a drop impact applied, the compressive strength was measured and found to be 36.1 kg/mm².

Comparative Example 1

Carbon fibers (T800H produced by Toray Industries, Inc.) were impregnated with the same matrix resin as used in Present Invention Example 1, to prepare a prepreg not containing the thermoplastic resin fibers using the drum winding method. The areal weight of the carbon fibers was 190 g/m² and the areal weight of the matrix resin was 103.6 g/m².

From the prepreg, a cured board was prepared as in present Invention Example 1, and with a drop impact applied, the compressive strength was measured and found to be 19.7 kg/mm².

Present Invention Example 4

Release paper was coated with the same matrix resin composition as used in Present Invention Example 1 by 45.3 g/m² using a reverse roll coater.

The resin film was sprayed, on its surface, with nylon 66 fibers (15-denier, five filaments) using an aspirator with an impact plate attached at the tip and compressed air. The areal weight of the nylon fibers was 6.5 g/m².

The resin film sprayed with nylon 66 filaments was fixed on a drum winder, and carbon fibers (T800H produced by Toray Industries, Inc.) were wound around it. Furthermore, another resin film sprayed with nylon 66 was bonded onto the carbon fiber-wound resin film. Both the films were pressed for impregnation, to obtain a prepreg. The areal weight of the carbon fibers was 190 g/m². From the prepreg, a cured board was prepared as in Present Invention Example 1, and with a drop impact applied, the compressive strength was measured and found to be 34.4 kg/mm².

Present Invention Example 5

Release paper was coated with the same matrix resin composition as used in Present Invention Example 1 by 45.3 g/m² using a reverse roll coater.

The resin film was sprayed, on its surface, with a polyamide (Glylamide TR-55 produced by Emser Werke) fiber discharged from a nozzle plate with one orifice using an aspirator with an impact plate at the tip and compressed air while the fiber was drawn. The areal weight of the polyamide fiber was 6.5 g/m². The resin film sprayed with Glylamide TR-55 fiber was fixed on a drum winder, and carbon fibers (T800H produced by Toray Industries, Inc.) were wound around it. Furthermore, another resin film sprayed with a Glylamide TR-55 fiber was bonded onto the carbon fiber-wound resin film, and both the films were pressed for impregnation, to obtain a prepreg. The areal weight of the carbon fibers was 190 g/m².

From the prepreg, a cured board was prepared as in Present Invention Example 1, and with a drop impact applied, the compressive strength was measured and found to be 33.7 kg/mm².

Present Invention Example 6

A woven carbon fiber fabric (plain weave of carbon fibers T800H produced by Toray Industries, Inc.; 196 g/m² as the weight of fibers per unit area) was sprayed, on its one side, with nylon 66 fibers (15-denier, five filaments) using an aspirator with an impact plate attached at the tip and compressed air. The areal weight of the nylon 66 fibers was 16.0 g/m². The sprayed woven fabric was impregnated with the same matrix resin as used in Present Invention Example 1, to obtain a prepreg. The areal weight of the resin was 130 g/m².

From the prepreg, a cured board was prepared as in Present Invention example 1, and with a drop impact applied, the compressive strength was measured and found to be 29.4 kg/mm².

Present Invention Example 7

Wire gauze was sprayed with a polyamide (Glylamide TR-55 produced by Emser Werke) fiber discharged from a nozzle plate with one orifice using an aspirator with an impact plate attached at the tip and compressed air while the fiber was drawn. The fiber sheet collected on the wire gauze was thermally bonded, to prepare a nonwoven Glylamide TR-55 fabric. The areal weight of the fiber was 6.5 g/m².

An intermediate product was prepared by rendering carbon fibers (T800H produced by Toray Industries, Inc.) with the same matrix resin as used in Present Invention Example 1 using the drum winding method. The areal weight of the carbon fibers was 190 g/m² and the areal weight of the matrix resin was 90.6 g/m².

The intermediate product had the nonwoven Glylamide TR-55 bonded on both sides, to prepare a prepreg.

From the prepreg, a cured board was prepared as in Present Invention Example 1, and with a drop impact applied, the compressive strength was measured and found to be 34.0 kg/mm².

Present invention Example 8

A nylon 6 fiber discharged from a nozzle plate with one orifice was drawn, scattered and collected on wire gauze using an aspirator with an impact plate attached at the tip and compressed air. The fiber sheet collected on the wire gauze was thermally bonded using a heating press, to prepare a nonwoven nylon 6 fabric of 6.5 g/m² in the areal weight of the fiber.

An intermediate product was prepared by impregnating carbon fibers (T800H produced by Toray Industries, Inc.) with the same matrix resin as used in Present Invention Example 1 using the drum winding method. The areal weight of the carbon fibers was 190 g/m² and the areal weight of the matrix resin was 90.6 g/m². Two sheets of the nonwoven nylon 6 fabric were bonded onto both the sides of the intermediate product, to prepare a prepreg. From the prepreg, a cured board was prepared as in Present Invention Example 1, and with a drop impact applied, the compressive strength was measured and found to be 33.1 kg/mm².

Present Invention Example 9

Release paper was coated with the same matrix resin composition as used in Present Invention Example 1 by 45.3 g/m² using a reverse roll coater.

The same Glylamide TR-55 nonwoven fabric as used in Present Invention Example 7 was bonded onto the resin film, and the laminate was pressed to be fixed by a calender roll. Then, two sheets of the laminate were overlapped with the nonwoven fabric kept inside, onto both sides of collimated carbon fibers (T800H produced by Toray Industries, Inc.), and they were heated and pressed using a heat roll for impregnation, to obtain a prepreg.

The areal weight of the carbon fibers was 270 g/m².

From the prepreg, a cured board was prepared as in Present Invention Example 1, and with a drop impact applied, the compressive strength was measured and found to be 34.3 kg/mm².

Present Invention Example 10

Release paper was coated with the same matrix resin composition as used in Present Invention Example 1 by 45. 3 g/m² using a reverse roll coater.

The same nonwoven nylon 6 fabric as used in Present Invention Example 8 was bonded onto the resin film, and pressed to be fixed by a calender roll. Then, two sheets of the laminate were overlapped with the nonwoven fabric kept inside, onto both sides of collimated carbon fibers (T800H produced by Toray Industries, Inc), and they were heated and pressed using a heat roll for impregnation, to obtain a prepreg. From the prepreg, a cured board was prepared as in Present Invention Example 1, and with a drop impact applied, the compressive strength was measured and found to be 33.6 kg/mm².

Present Invention Example 11

A composite spun fiber discharged from a core-sheath composite spinning nozzle plate consisting of one part of polyethylene terephthalate discharged from the core and one part of nylon 6 discharged from the sheath was drawn, scattered and collected on wire gauze using an aspirator with an impact plate attached at the tip and compressed air. The fiber sheet collected on the wire gauze was thermally bonded using a heating press, to prepare a nonwoven fabric having a fiber areal weight of 6.5 g/m².

Release paper was coated with the same matrix resin composition as used in Present Invention Example 1 by 45.3 g/m² using a reverse roll coater.

The nonwoven fabric was bonded onto the resin film and pressed to be fixed by a calender roll. Then, two sheets of the laminate were overlapped with the nonwoven fabric kept inside, onto both sides of collimated carbon fibers (T800H produced by Toray Industries, Inc.), and they were heated and pressed using a heat roll for impregnation, to obtain a prepreg. The areal weight of the carbon fibers was 190 g/m².

From the prepreg, a cured board was prepared as in Present Invention Example 1, and with a drop impact applied, the compressive strength was measured and found to be 33.8 kg/mm².

Present Invention Example 12

(1) Synthesizing a Reactive Polyimide Oligomer

In a 3000 ml separable flask equipped with a nitrogen inlet, thermometer, stirrer and dehydrating trap, with the inside atmosphere substituted by nitrogen, 392 g (0.91 mol) of bis[4-(3-aminophenoxy)phenyl]sulfone (BAPS-M), 39 g (0.11 mol) of 9,9'-bis(4-aminophenyl)fluorene (FDA) and 147 g (0.11 mol) of amino-terminal dimethylsiloxane of 650 $NH_2$ equivalents (BY-16-853 marketed by Toray Silicone) were stirred and dissolved into 2000 ml of N-methyl-2-pyrrolidone (NMP). Furthermore, 300 g (1.02 mol) of solid biphenyltetracarboxylic dianhydride was added little by little, and the mixture was stirred at room temperature for 3 hours, and subsequently at 120° C. for 2 hours. The flask was cooled to room temperature, and 50 ml of triethylamine and 50 ml of toluene were added. The flask was heated again for azeotropic dehydration, and about 30 ml of water was obtained. The reaction mixture was cooled, and diluted by a double amount of NMP, and the mixture was slowly poured into 20 liters of acetone, to precipitate amine-terminal siloxane polyimide oligomer as a solid product. The precipitate was dried in vacuum at 200° C.

The number average molecular weight (Mn) of the oligomer was measured by gel permeation chromatography (GPC) using dimethylformamide (DMF) as the solvent, and found to be 5500 in terms of polyethylene glycol (PEG). The glass transition point measured by a differential thermal analyzer (DSC) was found to be 223° C. The introduced siloxane skeleton and amine terminals could be confirmed by NMR spectrum and IR spectrum.

(2) Preparing a Resin for the Component B, and Measuring the Physical Properties of the Resin Twenty parts of the siloxane polyimide oligomer synthesized in (1) were added to 41 parts of 0,0'-diallylbisphenol A, and the mixture was heated at 140° C. for 2 hours. Then, 39 parts of diphenylmethane bismaleimide were homogeneously dissolved into the mixture. The vessel was connected to a vacuum pump, and kept in vacuum for defoaming. The mixture was poured into a mold preheated to 120° C. and treated so as to allow its release, and subjected to a curing reaction in an oven at 180° C. for 2 hours, to prepare a 3 mm thick cured resin board. The cured board was post-cured at 200° C. for 2 hours and at 250° C. for 6 hours. The Tg of the obtained cured resin was 295° C. The fracture strain energy release rate $G_{IC}$ was 450 J/m², and the flexural elastic modulus was 380 kg/mm². The resin board of 60×10×2 mm in size was boiled for 20 hours, and the water absorption coefficient was found to be 2.0%.

The cured resin was polished and the polished surface was dyed with osmium tetroxide, and the reflected electron image was observed by a scanning electron microscope. It was found that a micro-phase separated structure with a continuous phase mainly composed of the oligomer was formed.

(3) Preparing a Prepreg and a Composite Material and Measuring their Physical Properties Firstly, 20 parts of the siloxane polyimide oligomer synthesized in (1) were dissolved into 41 parts of 0,0'-diallylbisphenol A, and 39 parts of diphenylmethane bismaleimide were mixed homogeneously with the solution using a kneader.

Release paper coated thinly with a silicone releasing agent was coated with the resin composition at a constant thickness, to obtain a resin film of 47 g/m² in areal weight.

Two sheets of a nonwoven nylon 6 fabric, 5 g/m² in weight per unit area, was overlapped onto both sides of unidirectionally paralleled carbon fibers ("Torayca" T800H produced by Toray Industries, Inc.) at a areal weight of 190 g/m², and two sheets of the resin film were pressed onto the laminate, for impregnating the fibers with the resin, to prepare a prepreg. The prepreg was good in tackiness and drapability.

The prepreg was held between two smooth teflon sheets, and gradually heated to 180° C., taking two weeks, to be cured. Its cross section was observed and photographed using a microscope. The amount of the nonwoven fabric present in the region from the surface regions of the prepreg to depths of 30% of the prepreg thickness was evaluated and found to be 100%, to show that the nonwoven fabric was sufficiently localized in the surface regions of the prepreg.

The cured prepreg was dyed with osmium tetroxide, and its reflected electron image was observed by a scanning electron microscope. It was found that the matrix resin formed a micro-phase separated structure with an oligomer-rich continuous phase.

Twenty four layers of the prepreg were laminated in quasi-isotropic configuration ((+45'/0'/−45'/90')$_{3S}$), and the ordinary vacuum bag autoclave forming method was used to obtain a cured board by heating from 25° C. to 180° C. at a heating rate of 1.5° C./min at a pressure of 6 kg/cm² and heating at 180° C. for 2 hours for forming.

The cured board was post-cured at 200° C. for 2 hours and at 250° C. for 6 hours. The fibers in the cured board accounted for 55.4 vol %, and the resin accounted for 35.8 wt %. After completion of the formation, the cross section was observed by an optical microscope, and it was confirmed that all the nonwoven fabric existed perfectly in the inter-layer region of the cured board. The cured board was polished and the polished surface was dyed with osmium tetroxide, and its reflected electron image was observed by a scanning electron microscope. A micro-phase separated structure with a continuous phase mainly composed of the imide oligomer was observed.

A drop impact was applied to the cured board, and the compressive strength was measured and found to be 33.1 kg/cm².

Industrial Availability

The prepregs of the present invention contain irregularly arranged long thermoplastic resin fibers near the surface layers, and therefore are tacky and drapable, and the composite materials obtained by heating and forming the prepregs are high in elastic modulus and heat resistance, and very high in impact resistance and inter-layer toughness. Furthermore, the prepregs are easy to produce and high in their latitude in availability of materials, this being industrially significant.

What is claimed is:

1. A prepreg layer for combination with one or more additional layers of said prepreg to form a fiber-reinforced plastic composite, said prepreg layer comprising:

(A) a multiplicity of reinforcing fibers (A) having fiber lengths of at least 5 cm, (B) a matrix resin body (B) in which said reinforcing fibers (A) are embedded, and (C) a plurality of individual discrete surface region thermoplastic resin fibers (C) in the form of a non-woven fabric having fiber lengths of 3 cm or more, said fibers (C) being arranged at random on and within said surface portion of said matrix resin body (B), said fibers (C) being localized in a surface region adjacent said surface, said surface region extending to a depth of 30% into the thickness direction of said prepreg layer, wherein more than 90% of said thermoplastic fibers (C) are localized in said surface region.

2. The prepreg layer defined in claim 1, wherein 90% of said fibers (C) are localized in a depth of 20% in said thickness direction.

3. The prepreg layer defined in claim 1, wherein said matrix resin body (B) has an exposed surface having both exposed thermoplastic fibers (C) and exposed thermoplastic resin (B).

4. The prepreg layer defined in claim 1, wherein said matrix resin body (B) is a thermosetting resin.

5. The prepreg layer defined in claim 1, wherein said matrix resin body (B) is an epoxy resin.

6. The prepreg layer defined in claim 1 wherein said resin (B) is a cured resin structurally separated into a microphase mainly composed of a thermosetting resin and a microphase mainly composed of a thermoplastic resin.

7. The prepreg layer defined in claim 6, wherein said thermoplastic resin microphase has the form of a three-dimensionally continuous network.

8. The prepreg layer defined in claim 6, wherein each of said thermoplastic and thermosetting microphases have the form of three-dimensionally continuous networks.

9. The prepreg layer defined in claim 1, wherein the percentage of said thermoplastic resin fibers (C) is 2–30% of the combined weight of said fibers (C) plus said matrix resin (B).

10. The prepreg layer defined in claim 9, wherein said percentage is 2–20%.

11. The prepreg layer defined in claim 9, wherein said percentage is 4–13%.

* * * * *